UNITED STATES PATENT OFFICE.

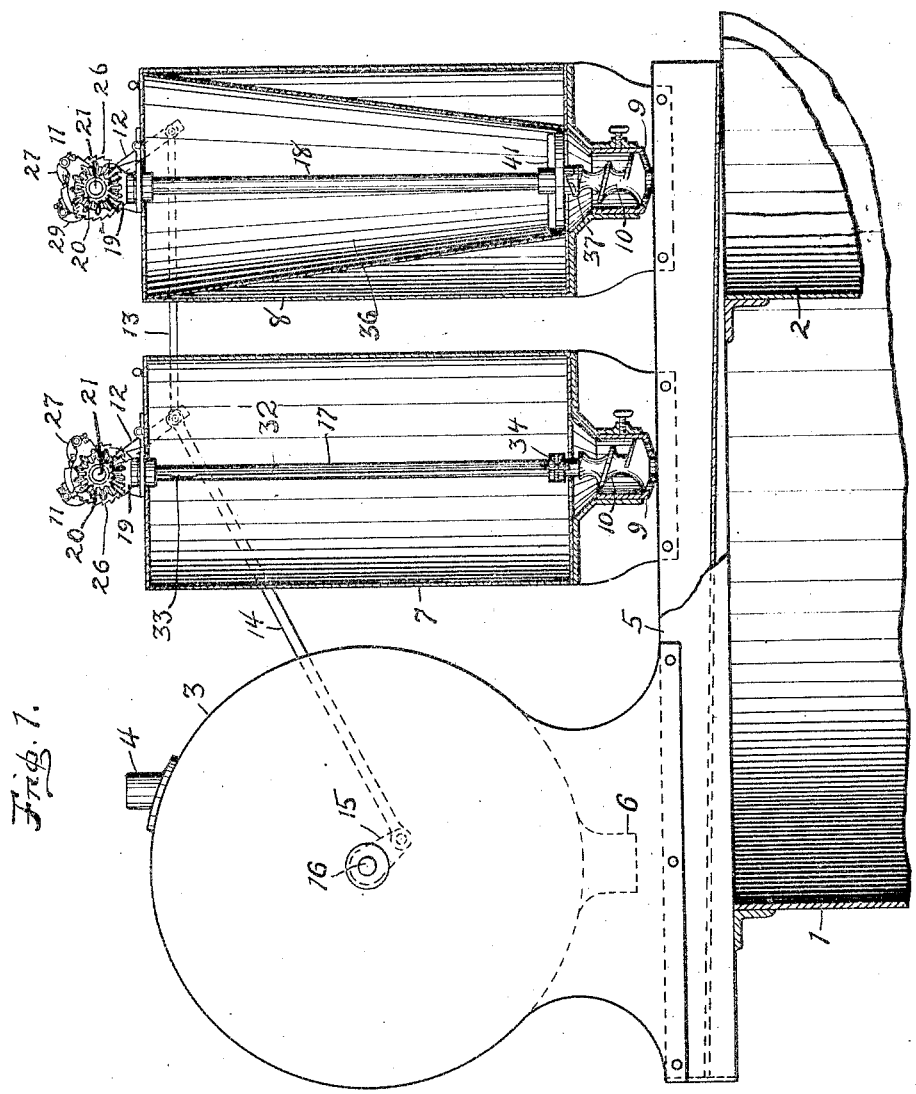

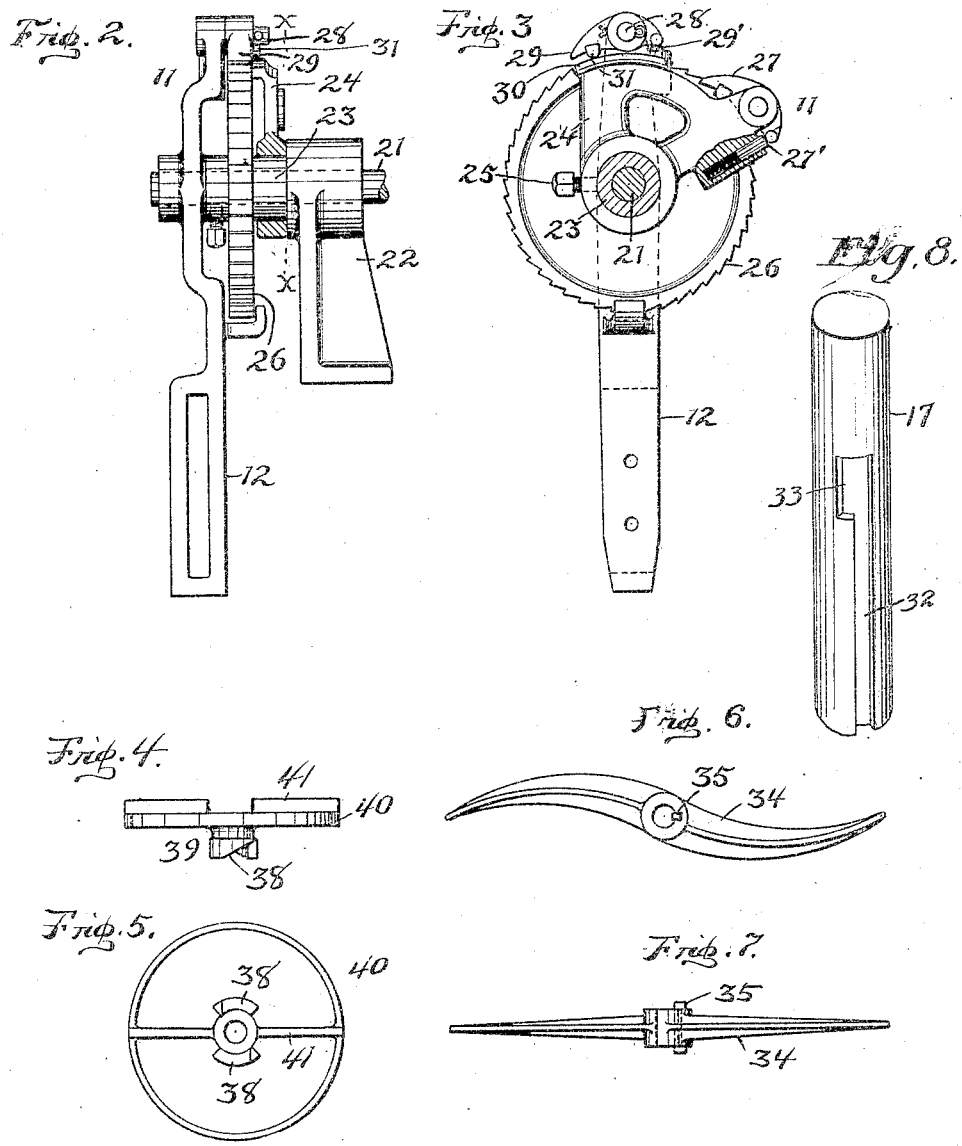

WALTER WARRINER, OF FORT WAYNE, INDIANA.

FEEDER FOR WATER-SOFTENING PLANTS.

1,326,553.     Specification of Letters Patent.     Patented Dec. 30, 1919.

Application filed May 28, 1917. Serial No. 171,357.

*To all whom it may concern:*

Be it known that I, WALTER WARRINER, a citizen of the United States of America, and resident of Fort Wayne, in the county of Allen and State of Indiana, have invented certain new and useful Improvements in Feeders for Water-Softening Plants, of which the following is a specification.

This invention relates to improvements in feeders for water softening plants of that character wherein chemicals are introduced into a tank of water in proportionate quantities with the water as it enters the tank, the object being to afford means of introducing pulverulent chemicals into the water in varying proportionate quantities accordingly as may be required to obtain the desired effect upon the water.

The present invention contemplates the gradual introduction of chemical substances into the water to be treated, in varying proportionate ratio accordingly as the apparatus is adjusted. The invention also contemplates feeding mechanisms especially suited respectively for handling the several different kinds of chemicals. Such, for example, as lime and soda-ash.

The objects of the invention are accomplished by the construction illustrated in the accompanying drawings, in which:—

Figure 1 is a side elevation of the device mounted upon a treating tank;

Fig. 2 is a detailed view showing a side elevation of a ratchet mechanism, partly in section, that is used on each of the feed hoppers;

Fig. 3 is a view of Fig. 2 in a plane at right angles thereto and in section on line $x$—$x$ thereof;

Fig. 4 is a side elevation of an agitator used in one of the feed hoppers;

Fig. 5 is a bottom plan view of Fig. 4;

Fig. 6 is a plan view of an agitator used in another of the feed hoppers;

Fig. 7 is a side view of Fig. 6, and Fig. 8 is a perspective view of the upper portion of one of the agitator shafts showing a keyway made therein with an offset.

Similar characters of reference indicate corresponding parts throughout the several views and referring now to the same:—

1 is a treating tank of the usual type employed in water softening plants and 2 is the central chamber thereof through which the water is introduced into the tank. 3 is a water-wheel and 4 is the port through which water is applied to the water-wheel. The water-wheel is mounted upon a chute 5 that rests upon the top of the treating tank and is arranged to receive water from the discharge spout 6 of the water-wheel and convey it to the central chamber 2 into which it flows.

Upon the chute are supported two feed hoppers 7 and 8 respectively, each having a discharge nozzle 9 at the lower end thereof immediately over the chute, and also a spiral-feeder 10 and 10' within the corresponding nozzle adapted to force the pulverulent material through the nozzle into the chute as the feeder is rotated. At the top of each feed hopper is a ratchet device 11 having an arm 12 for actuating the same as the latter is swung to and fro. The actuating arms of the two ratchet-mechanisms are connected by a bar 13 that is also coupled with a connecting-rod 14 which is driven by a crank 15 on the drive-shaft 16 of the water-wheel. Thus, as the water-wheel is rotated, the actuating arms 12 of the ratchet mechanisms are swung to and fro.

Each of the feed hoppers has extending therethrough a vertical shaft 17 and 18 respectively, the lower end of the shaft having connection with the corresponding spiral feeder and being adapted to actuate the same when rotated. Upon the upper end of each shaft is fixed a bevel pinion 19 that meshes with the corresponding pinion 20 that is fixed upon a counter-shaft 21. The outer end of each counter-shaft extends through a bracket 22 that surmounts the corresponding hopper. The bracket has an extending boss 23 concentric with the counter-shaft that extends therethrough and upon the boss is mounted an adjustable bracket 24. A set-screw 25 in the bracket bears against the boss and holds the bracket upon the boss in the various positions to which it is adjusted. A ratchet-wheel 26 is fixed upon the shaft 21 and is engaged by a detent pawl 27 that is mounted in connection with the bracket 24, the pawl serving to prevent retraction of the ratchet-wheel as the latter is progressed. A spring-pressed plunger 27' bears against one end of the pawl so that its opposite end will be constantly held into contact with the ratchet-wheel. The upper end of the arm 12 has a stud 28 upon which is mounted a pawl 29 adapted to engage the ratchet-wheel and actuate the same as the arm is swung to and fro. The bracket 24 has a guide 30 thereon and the pawl 29 has a lug 31 in the same vertical plane as the guide 30 on the bracket, and the lug is adapted to ride upon the guide, when it comes into contact therewith, which has the effect of lifting the pawl 29 from engagement with the ratchet-wheel. By adjustably shifting the bracket 24 upon the boss 23, the duration of the engagement of the guide and the lug on the ratchet during the swinging movement of the actuating arm may be more or less protracted with the result that the ratchet-wheel will become progressed correspondingly to a greater or lesser extent. A spring-pressed plunger 29' bears against one end of the pawl 29 and tends to hold the latter in actuating position, the plunger being of the same construction as that previously mentioned as applied to the pawl 27.

The shaft 17 that extends through the hopper 7 has a key-way 32 with an off-set 33 therein near the upper end of the shaft, and upon the shaft is mounted a winged agitator 34 adapted to slide vertically upon the shaft. The agitator has in its hub a key 35 that slides longitudinally in the key-way and is adapted to be moved laterally into the off-set 33 when the agitator is raised to the upper end of the hopper by turning the agitator on the shaft, the purpose being to temporarily sustain the agitator in the upper part of the hopper while the latter is being replenished. The purpose of the agitator is to press the contents of the hopper downwardly toward the feeder and the agitator shown herein has been found suitable for the purpose in an apparatus of this kind when a substance such as pulverulent lime is being handled.

The feed hopper 8 is constructed somewhat differently from the other hopper, and has a conical inner shell 36, and the spiral-feeder 10' upon the lower end of the shaft 18 has slanting jaws 37 against which bear correspondingly opposite slanting jaws 38 on the hub 39 respectively on the agitator 40. A blade 41 extends from the hub and is connected at its outer ends to the agitator forming part thereof. As the feeder 10' in the nozzle of the hopper 8 rotates, the agitator tends to move therewith, but, if the contents within the hopper tends to pack and resist rotation of the agitator, the latter will be forced upwardly against the contents owing to the slanting faces 37 and 38 of the feeder and the hub of the agitator. As the feeder continues to revolve, the agitator with its burden will drop into inital position which has the effect of shocking the mass so that it will become broken up, the particles gravitating into the nozzle and being forced by the feeder through the discharge end into the chute. This latter construction is suitable for handling such pulverulent material as soda-ash.

The construction herein set forth affords the facility of introducing several different chemical substances into the water that is supplied to a treating tank, and affording also means for varying proportionately the quantity of the several compositions as they are fed into the treating tank.

What I claim is:—

1. In feeding mechanism, a container for pulverulent material; a feeder in the bottom of the container for discharging material therefrom and having upwardly extending slanting jaws; a shaft for actuating the feeder; and an agitator loosely mounted on the shaft and having downwardly extending slanting jaws adapted to bear upon the jaws of the feeder so that the agitator becomes actuated as the feeder rotates.

2. In feeding mechanism having a container with a feeder located therein for the discharge of pulverulent material therefrom; a vertically disposed shaft for actuating the feeder and having a longitudinal key-way made therein with an offset at its upper end; and an agitator on the shaft having a key in connection therewith that extends loosely into the key-way and which is adapted to be moved into the offset so that the agitator may thereby be temporarily supported in an elevated position.

In testimony whereof I affix my signature in presence of two witnesses.

WALTER WARRINER.

Witnesses:
　MATILDA METTLER,
　SOPHIA HEINE.